Sept. 9, 1969          J. P. GARAUD          3,465,602
APPARATUS FOR TRANSFORMING A ROTARY MOTION INTO
AN ALTERNATING LINEAR MOVEMENT
Filed Nov. 20, 1967                          2 Sheets-Sheet 1
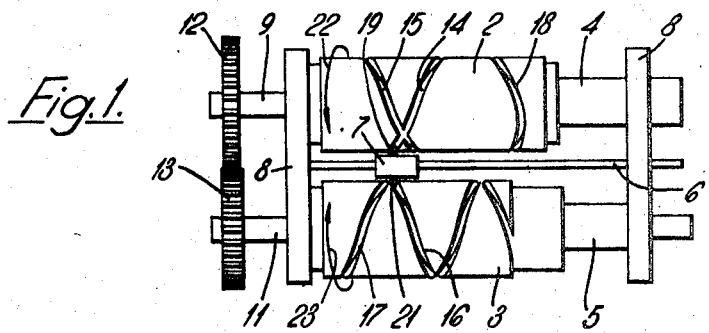
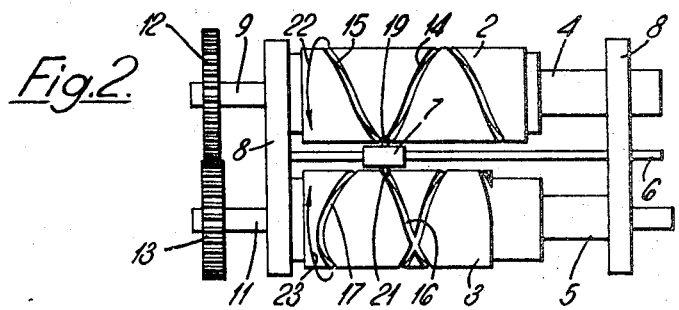
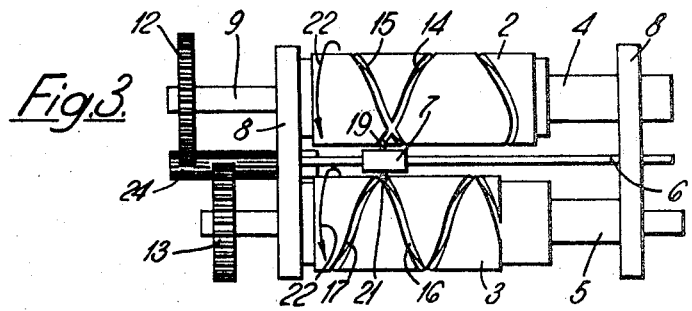
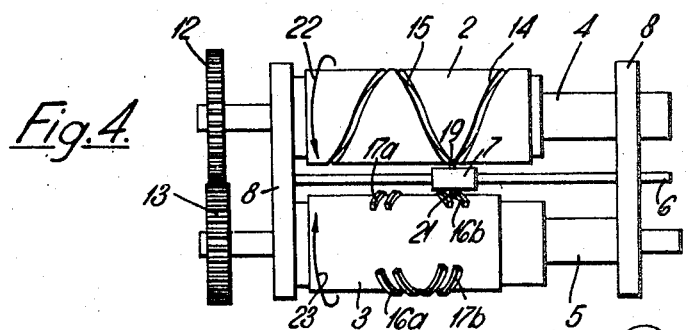
Inventor
Jean Pierre Garaud
By Cushman, Darby & Cushman
Attorneys Sept. 9, 1969    J. P. GARAUD    3,465,602
APPARATUS FOR TRANSFORMING A ROTARY MOTION INTO
AN ALTERNATING LINEAR MOVEMENT
Filed Nov. 20, 1967    2 Sheets-Sheet 2
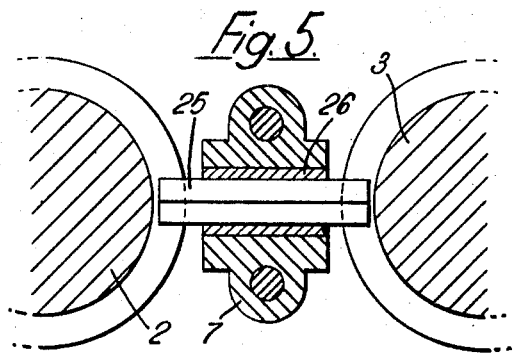
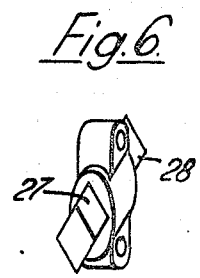
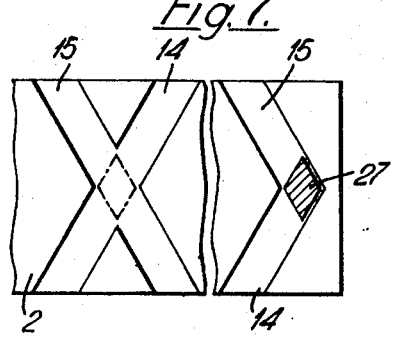
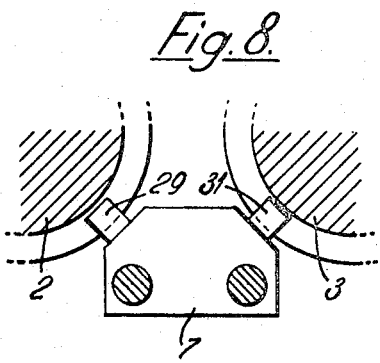
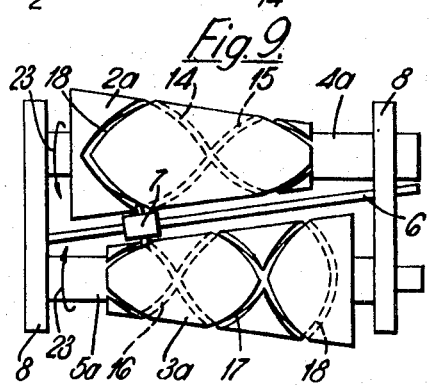
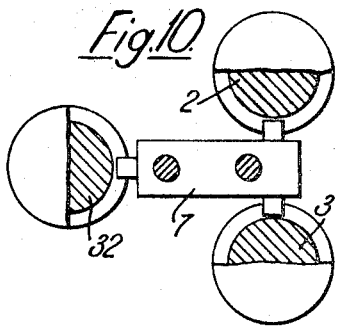
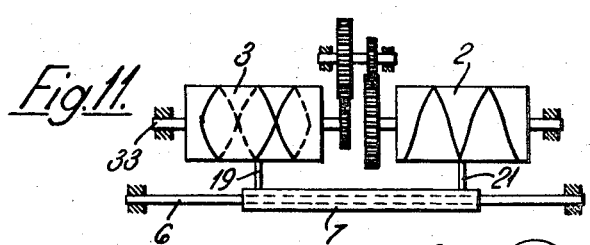
Inventor
Jean Pierre Garaud
By
Cushman, Darby & Cushman
Attorneys even# United States Patent Office 3,465,602
Patented Sept. 9, 1969

3,465,602
APPARATUS FOR TRANSFORMING A ROTARY MOTION INTO AN ALTERNATING LINEAR MOVEMENT
Jean Pierre Garaud, Bron, Rhone, France, assignor to Societe Rhodiaceta, Paris, France, a French body corporate
Filed Nov. 20, 1967, Ser. No. 684,222
Claims priority, application France, Nov. 21, 1966, 47,971
Int. Cl. F16h 25/12
U.S. Cl. 74—58                                    9 Claims

ABSTRACT OF THE DISCLOSURE

The specification discloses apparatus for producing reciprocatory linear motion, in which a slider is provided with two pins one of which engages in one of two helical grooves of opposite sense on one roller, while the other engages in one of two helical grooves of opposite sense on another roller. The two rollers rotate about the same axis or about parallel axes. If desired a third roller with two similar grooves may be engaged by a third pin on the slider. The roller may be cylindrical or frusto-conical.

---

Devices for transforming a rotary movement into an alternating linear movement are frequently used in certain machine tools or other machines and in particular in the winding industry. These devices generally comprise a sliding element which is given a reciprocating movement on a linear slideway by means of a roller whose axis is parallel to the said slideway and in the surface of which there are cut two helical grooves with opposite pitch to one another which are connected to one another at each end at reversal points, a pin on the sliding element engaging constantly in one of these grooves. When the roller rotates, the two helical grooves engage successively on the sliding element pin, causing the element to be displaced in one direction and then the other along the slideway. Although satisfactory generally, such devices have the disadvantage of comprising in most cases points of discontinuity which generate shock and vibrations. In fact if the period of the linear movement of the sliding element is to be greater than that of the rotation of the roller, which is generally the case, the helical grooves intersect at points which constitute discontinuity zones.

The present invention aims at obviating this disadvantage.

According to the invention there is provided apparatus for transforming a rotary motion to an alternating linear motion, such apparatus comprising at least two rollers mounted for rotation about substantially parallel axes, said rollers having surfaces with substantially parallel generatrices thereon, in each of which surfaces are formed two helical grooves, the two grooves of each roller being of opposite sense and a sliding element mounted for linear motion parallel to said generatrices of said rollers, said sliding element having two pins one engaged in a groove of each roller, so that, upon rotation of said rollers, an alternating linear motion is imparted to said sliding element.

This multiple guidance of the sliding element makes it possible to distribute symmetrically the forces acting on it and on the slideway, eliminating any torque phenomena, which is particularly advantageous at the reversal points, more particularly in the case of rapid reversal.

Preferably, the pitches of the two helical grooves of a first of said two rollers are constant and the same as one another, and the pitches of the two helical grooves of the second of said two rollers are constant and the same as one another and the two rollers are interconnected to drive the first and second rollers at a relative velocity in the inverse ratio to the pitches of the helical grooves thereof. Desirably, the pitch of the helical grooves of the first roller is different from the pitch of the helical grooves of the second roller, and the intersection points of the helical grooves of the first roller are spaced in a direction parallel to the parallel generatrices of the rollers, from the intersection points of the helical grooves of the second roller. Thus when one of the pins of the sliding element is situated at a point of intersection of the grooves of the associated roller, at least one other pin of the sliding element is guided by a portion of the grooves of its associated roller, other than at a point of intersection of the said grooves. The grooved rollers can be arranged in any desired manner relative to one another, but in all cases they have at least one generatrix parallel to the slideway of the sliding element. If they are cylindrical, these two grooved rollers can be arranged coaxially or parallel to one another but, in all cases, their axes are parallel to the slideway of the sliding element.

A particularly advantageous case of combining cylindrical rollers of different diameters is that wherein the ratio of the rotational speeds of these rollers is inverse to the ratio of their diameters so that the peripheral speeds of these rollers are equal and the helix angles are the same at the points of contact with the pins. Thus the forces applied to the pins by each of the rollers are the same. If they are conical, the two grooved rollers are advantageously arranged head to tail, i.e., with the wider portion of one adjacent the narrower portion of the other and vice-versa. In the same way, the pins of the sliding element can be parallel, coaxial or form any desired angle with one another, which permits the arrangement of a plurality of sliding elements.

The direction of rotation of the rollers is optional. When it is desired to reverse the direction of rotation of one of the rollers, it is sufficient to bring the pins of the sliding element first of all to the reversal points of the helical grooves of these rollers, these points necessarily corresponding in time to the reversal instants.

Advantageously, to facilitate the changing of the pins of the sliding element, for example after they have been subjected to wear, one of the ends of one of the rollers corresponding to one of the connecting grooves and/or the other end of the other roller may be provided with a reduced diameter portion into which the grooves lead. It is also possible to arrange that one of the rollers comprises grooves only in the zones corresponding to the points of intersection of the grooves provided in the other roller. The pins of the sliding element may be constituted by journalled wheels. Advantageously, the pins are constituted by a common rotating rod mounted in a plain bearing carried by the sliding element. This common rod may be of a smaller diameter than the diameter of the wheels, and makes it possible to have more rapid reversals at the reversal points. Alternatively, the pins are rhomboid in cross-section, the sides of each rhombus being inclined with respect to one another at an angle corresponding to the angle between the helical grooves of the roller in which such pin engages. Finally, it is also possible to provide a larger number of rollers, for example three.

The invention will be more readily understood from the following description, given merely by way of example, with reference to the accompanying drawings in which:

FIGURE 1 is a front elevation of a first embodiment of apparatus according to the invention with the two rollers rotating in opposite senses;

FIGURE 2 is a view similar to FIGURE 1, the sliding element being at another point of its travel;

FIGURE 3 is a similar view to FIGURES 1 and 2, the two rollers rotating in the same direction;

FIGURE 4 shows a modified embodiment of the apparatus of FIGURES 1 and 2;

FIGURE 5 shows a particular arrangement of the driving pins of the sliding element;

FIGURES 6 and 7 illustrate a modified embodiment of these pins;

FIGURES 8, 9, 10 and 11 show four other constructional variants of the apparatus.

In FIGURES 1 to 4, the apparatus comprises two cylindrical rollers 2 and 3 whose shafts 4 and 5 are parallel to one another and parallel to a slideway 6 on which the sliding element 7 can be displaced. The rollers 2 and 3 and the slideway 6 are supported by two lateral frame members 8.

The left hand end shafts 9 and 11 on the rollers 2 and 3 carry toothed wheels 12 and 13 respectively. One of the rollers 2 or 3, for example the roller 2, is driven in rotational movement from a driving device (not shown) acting either on the toothed wheel 12 or on another part such as a pinion, pulley or the like, fixed to the shaft 9.

Each roller 2 is provided on its cylindrical surface with two helical grooves 14 and 15 of opposite sense to one another, and the roller 3 is similarly provided with grooves 16 and 17, the two grooves of each roller being connected at their ends by a connecting or reversal groove 18 forming a reversal point.

A sliding element 7 mounted on slideway 6 includes two coaxial pins 19 and 21 which engage respectively in one of the grooves of the roller 2 and one of the grooves of the roller 3.

As the drawings show, the pitch of the grooves 14 and 15 differs from that of the grooves 16 and 17. In the example selected, the pitch of the grooves 14 and 15 (which is constant but which could be different for each of these grooves) is such that the roller 2 has to effect three complete revolutions for the sliding element 7 to carry out a total out and back travel. On the other hand, the grooves 16 and 17 of the roller 3 have such a pitch that in order to obtain the same travel of the sliding element 7, this roller 3 has to carry out four revolutions.

Consequently, the movement produced by the grooves of the rollers 2 and 3 would be different if these rollers were driven at the same rotational speed. To obtain identity of these movements, all that has to be done is to drive these rollers in such a manner that they bring about the total forward and return travel of the sliding element 7 in the same time. In this example, the roller 2, therefore, carries out three revolutions while the roller 4 carries out four revolutions. Therefore, the ratio of the speeds of the roller 2 and the roller 3 is equal to the ratio of their numbers of revolutions necessary for the travel of the sliding element 7. In this example, the ratio is 3/4 and thus the ratio of the number of teeth of the toothed wheel 12 relative to that of the toothed wheel 13 is equal to 4/3.

The difference in the pitches of the grooves of one roller relative to that of the other roller has the effect that the points of intersection of the grooves of one of the rollers do not correspond to the points of intersection of the grooves of the other roller, that is to say when, as FIGURE 1 shows, the pin 21 of the sliding element 7 is situated at a point of intersection of the grooves 16 and 17 of the roller 3, the pin 19 is situated in a continuous portion of the groove 14 of the sliding element 2. On the other hand, when, as FIGURE 2 shows, the pin 19 of the sliding element 7 is at a point of intersection of the grooves 14 and 15, the pin 21 is situated in a continuous portion of the groove 16 of the roller 3. In this way the guidance of the pins 19 and 21 of the sliding element 7 is effected without discontinuity, the discontinuities of the grooves of one of the rollers corresponding to the continuous zones of the grooves of the other roller.

As FIGURE 4 shows, it is also sufficient if one of the two rollers, for example, the roller 3, comprises grooves or lengths of grooving only in the zones 16a–16b, 17a–17b corresponding to the zones of the intersection points of the grooves 14 and 15 of the roller 2.

As in the example described hereinbefore, the rollers 2 and 3 are driven in opposite senses as indicated by the arrows 22 and 23. Of course it is possible to rotate the rollers 2 and 3 in the same sense, as indicated by the arrows 22 in FIGURE 3. This merely requires, for example, interposing an intermediate pinion 24 between the toothed wheels 12 and 13.

As FIGURES 1 to 3 show, the roller 3 is truncated i.e., is provided with a portion of reduced diameter, at its righthand end so that its reversal groove 18 corresponding to this zone is eliminated, the grooves 16, 17 leading onto this truncated or reduced diameter portion.

The discontinuity which results therefrom at roller 3 is of course compensated by the presence of a groove 18 at the corresponding end of the roller 2, so that the continuity in the driving of the sliding element 7 is ensured. By providing the reduced diameter portion the pin 21 of the sliding element 7 may be freed when it arrives at the righthand end of travel and can be exchanged if necessary, without disassembling the roller 3. Naturally, the left-hand end of the roller 2 could be truncated in order to facilitate exchanging the pin 19 of the sliding element 7.

The pins 19 and 21 can of course be constituted by journals supporting wheels. However, they are advantageously constituted, as FIGURE 5 shows, by a single rotating pin or rod 25 mounted in a bearing 26 fast with the sliding element 7. This arrangement is applicable also more particularly to the example illustrated in FIGURE 3 where the rollers 2 and 3 rotate in the same sense. In fact, in this case the pin 25 is urged in the same rotational direction by the grooves of the two rollers 2 and 3, this direction being reversed at the same time as the direction in which the sliding element 7 is displaced; only a negligible differential effect occurs owing to the difference in the developments of the grooves of the two rollers. The single pin 25, which can be of a much smaller diameter than the optional wheels, also makes it possible to obtain very rapid reversals of the direction of movement of the sliding element 7, since the extreme radii of revolution of the grooves in the rollers can be equal to the radius of this pin 25 for low rotational speeds of the rollers 2 and 3, or slightly greater than this radius, by a few millimetres or fractions of millimetres, in the case of a high rotational speed for the rollers 2 and 3.

In a modified embodiment illustrated in FIGURES 6 and 7, the rotating pin 25 is replaced by two coaxial sliders 27 and 28 of rhomboid cross-section. The angles of the sides of the rhombus are defined by the pitch of the helices shown in FIGURE 7 which, in this case, are not to be of constant pitch. The two sliders 27 and 28 moreover do not have the same cross-section. The reversal groove connecting the grooves 14 and 15 is simply constituted by the meeting point of the two grooves.

Whatever the embodiment used for the pins 19 and 20 of the sliding element 7, their coaxial arrangement as described in the preceding examples has the advantage of giving the assembly perfect equilibrium, more particularly during reversal of the direction of movement of the sliding element 7. However, this arrangement is not obligatory and, as FIGURE 8 illustrates, the sliding element 7 can be equipped with two pins 29 and 31 forming any desired angle with one another.

In the embodiment illustrated in FIGURE 9, the device comprises two conical rollers 2a and 3a arranged head to tail, with their shafts 4a and 5a parallel to one another and their nearest generatrices parallel to the slideway 6 of the sliding element 7. These rollers have their smalldiameter ends truncated and have reversal grooves 18 only at their large-diameter ends. The presence of a large diameter facilitates the formation of the reversal grooves, and the fact that the rollers 4a and 5a are conical makes it possible to obtain this large diameter without increasing the bulk of the device.

As FIGURE 10 shows, it is also possible to provide a third roller 32 associated with the rollers 2 and 3 and comprising identical grooves to those of one of the rollers 2 and 3, or different therefrom.

FIGURE 11 illustrates a modified embodiment of apparatus wherein the rollers 2 and 3 are arranged coaxially on an axis 33 parallel to the axis of the slideway 6 of the sliding element 7, the pins 19 and 21 of the latter being in this case arranged parallel to one another, at each end of the sliding element 7.

I claim:

1. Apparatus for transforming a rotary motion into an alternating linear motion, said apparatus comprising in combination:
    (a) a first and second roller mounted for rotation about substantially parallel axes;
    (b) substantially parallel generatrices on said rollers;
    (c) a first helical groove formed on the surface of each roller;
    (d) a second helical groove formed on the surface of each roller, the first and second helical grooves of the first roller being of the opposite sense, and the first and second helical grooves of the second roller being of the opposite sense, the pitches of said first and second helical grooves of said first roller being different from the pitches of said first and second helical grooves of said second roller, respectively, in the same ratio;
    (e) a reversal groove in each said roller, each said reversal groove connecting said first and second helical grooves of the associated roller;
    (f) a sliding element mounted for linear motion parallel to said parallel generatrices of said rollers;
    (g) two pins on said sliding element, one pin engaged in a groove of each roller, whereby rotation of said roller is effected to cause alternating linear motion of said sliding element; and
    (h) drive means interconnecting said first and second rollers effective to drive said first and second rollers at a relative velocity in inverse ratio to the pitches of the helical grooves thereof.

2. The apparatus defined in claim 1, wherein the pitches of the first and second helical grooves of said first roller are constant and the same as one another and the pitches of the first and second helical grooves of the second roller are constant and the same as one another.

3. The apparatus defined in claim 1, wherein one of said rollers has only one reversal groove at one end thereof, wherein said one roller is formed, at the other end thereof, with a reduced diameter portion, and wherein the first and second helical grooves of said one roller are connected to said reduced diameter portion.

4. The apparatus defined in claim 1, and further comprising a third roller mounted for rotation about an axis substantially parallel to said parallel axes, a genetatrix to said third roller, parallel to said parallel generatrices of said first and second rollers, a first and second helical groove formed in the surface of said third roller, the first and second helical grooves of said third roller being of the opposite sense and a third pin on said sliding element engaged in a helical groove of said third roller.

5. The apparatus defined in claim 1, wherein said pins are formed on the ends of a rod rotatable in said sliding element.

6. The apparatus defined in claim 1, wherein said pins are rhomboid in cross section.

7. The apparatus defined in claim 1, wherein said surfaces of said rollers are cylindrical.

8. The apparatus defined in claim 1, wherein said surfaces of said rollers are frusto-conical.

9. The apparatus defined in claim 1, wherein said rollers are mounted for rotation about the same axis.

References Cited

UNITED STATES PATENTS

| | | | |
|---|---|---|---|
| 3,353,759 | 11/1967 | Sternberg | 74—58 |
| 2,483,121 | 9/1949 | Bourassa | 74—58 |

FRED C. MATTERN, Primary Examiner

W. S. RATLIFF, JR., Assistant Examiner